No. 679,186. Patented July 23, 1901.
J. W. PARKER.
LAND MARKER FOR CORN PLANTERS.
(Application filed Feb. 7, 1901.)
(No Model.) 2 Sheets—Sheet 2.
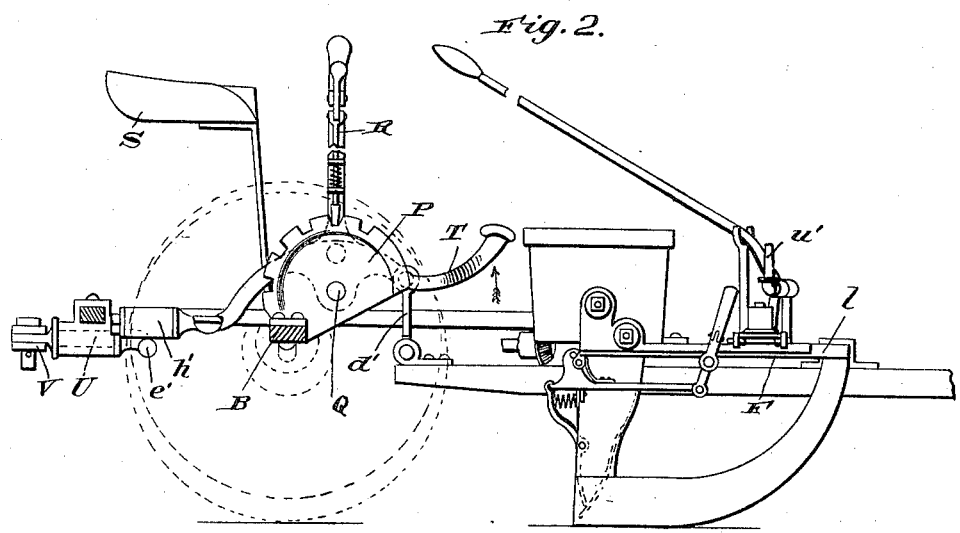
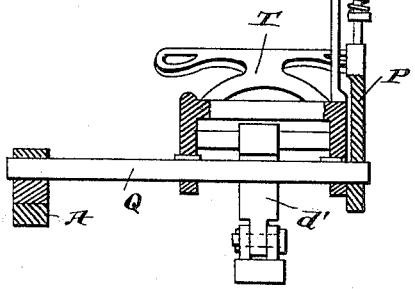

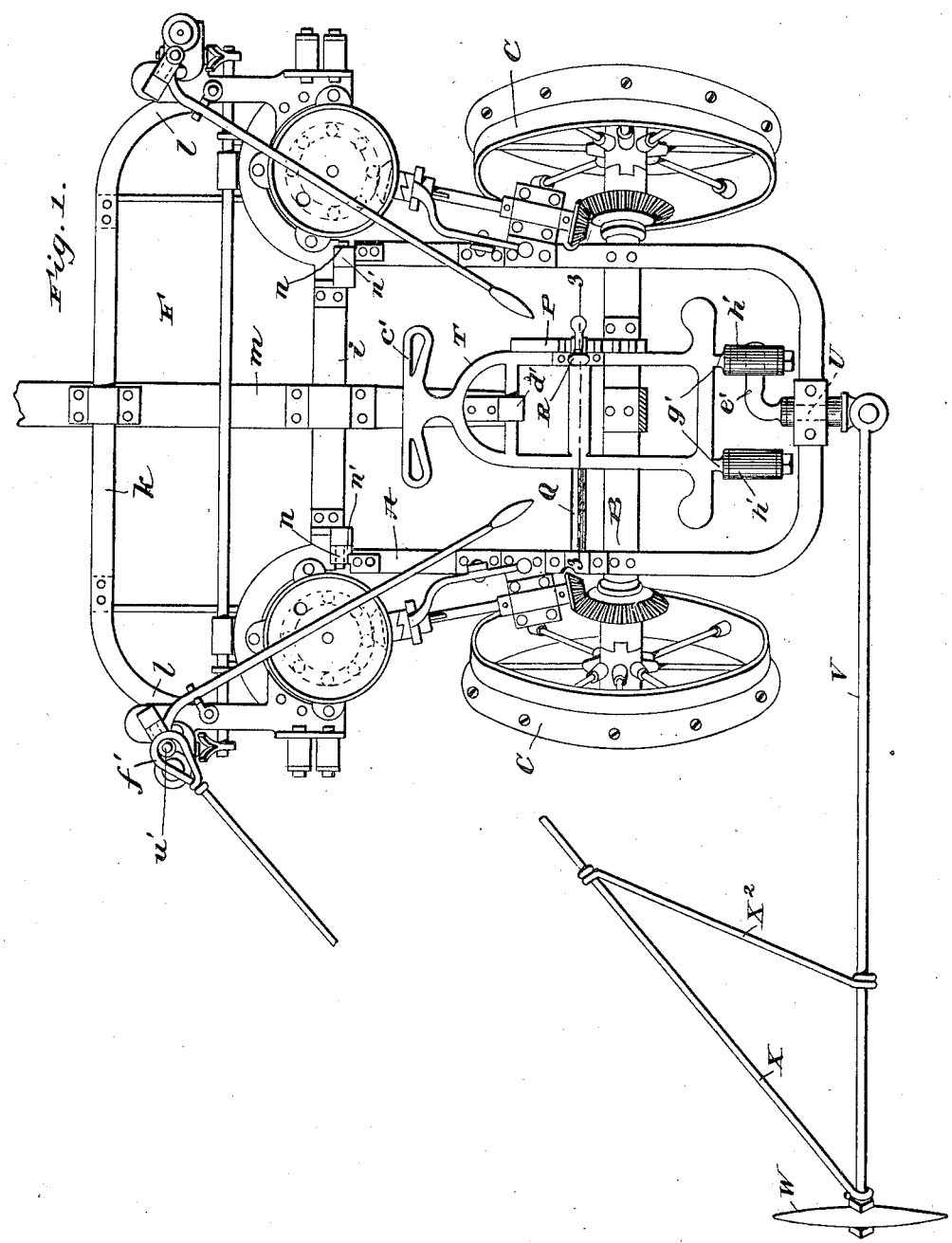

UNITED STATES PATENT OFFICE.

JAMES W. PARKER, OF ROCK ISLAND, ILLINOIS.

LAND-MARKER FOR CORN-PLANTERS.

SPECIFICATION forming part of Letters Patent No. 679,186, dated July 23, 1901.

Application filed February 7, 1901. Serial No. 46,384. (No model.)

*To all whom it may concern:*

Be it known that I, JAMES W. PARKER, a citizen of the United States, residing at Rock Island, in the county of Rock Island and State of Illinois, have invented new and useful Improvements in Land-Markers for Corn-Planters, of which the following is a specification.

My invention relates to improvements in corn-planters; and it consists in a land-marker construction designed more especially for use in the corn-planter forming the subject-matter of my contemporary application, filed October 18, 1900, Serial No. 33,499.

The present invention will be fully understood from the following description and claims when taken in connection with the accompanying drawings, in which—

Figure 1 is a top plan view of a planter embodying my present invention with some of the parts broken. Fig. 2 is a view of the planter, partly in longitudinal vertical section and partly in side elevation. Fig. 3 is a detail transverse section taken on the broken line 3 3 of Fig. 1.

Referring by letter to the said drawings, A is the supporting-frame of a corn-planter, which is preferably made of metal in U shape.

B is an axle connected to the frame and provided at its ends with traveling and covering wheels C, and F is a seeding and runner frame. This runner-frame is preferably composed of a rear transverse bar $i$, a forward transverse bar $k$, having rearwardly-extending portions $l$, fixedly connected to the bar $i$, and a draft-pole $m$, fixedly connected to the bars $k$ and $i$. The said frame is connected to the ends of the U-shaped wheel-frame A in a hinged manner, preferably through the medium of trunnions $n$, connected to the runner-frame and journaled in bearings $n'$ at the forward end of frame A. This construction obviously permits of the runner-frame being raised and lowered in the usual well-known manner.

P is a segmental rack fixed on the axle B, and Q is a transverse shaft journaled in suitable bearings on the main frame. On this shaft Q is a hand-lever R, which is arranged adjacent to the driver's seat S and is provided with the usual spring-pressed detent designed to engage the rack P. On the shaft Q is also fixed a pedal-lever T. This pedal-lever extends in front and rear of the shaft and is provided at its forward end with lateral portions $c'$, which afford rests for the feet of the driver and are designed to enable him to use his feet in depressing the forward portion of the lever. The lever T is connected in advance of the shaft Q and through the medium of a link $d'$ with the rear end of the pole $m$, whereby it will be seen that when the shaft Q, hand-lever R, and lever T are rocked in the direction indicated by arrow in Fig. 2 the runner-frame will be raised from the ground and out of its operative position.

U is a short shaft journaled in a suitable bearing at the rear end of the frame A and having a crank $e'$ at its forward end. V is a marker-bar connected to and extending laterally from the rear end of said shaft.

W is a marker, preferably in the form of a disk, carried at the outer end of the bar V.

X is a drag-bar connected to the bar V adjacent to the outer end thereof and having an eye $f'$ at its forward end designed to be placed over pins $u'$, arranged at either side of the runner-frame, and $X^2$ is a brace between the bars V and X, which insures the eye $f'$ taking over the pins $u'$. The lever T is provided with two rearwardly-extending parallel portions $g'$, which, as best shown in Fig. 1, are equipped with antifriction-sleeves $h'$ and are arranged to engage the crank $e'$ of shaft U. From this it follows that when the marker is in the position shown at the left of the machine and the shaft Q, lever R, and lever T are rocked in the direction indicated by arrow in Fig. 2 to raise the runner-frame the right-hand portion $g'$ of lever T engaging the crank $e'$ will operate to raise the bar V sufficiently to enable the driver to grasp the same and throw it, with the marker, over to a position at the right of the machine. When the marker is thus thrown over to the right of the machine, the crank $e'$ will assume a position below the left-hand portion or rearwardly-extending arm $g'$ of lever T, so that when the lever is again rocked to raise the runner-frame, as in making a turn, the bar V will be raised to such position as to enable the operator to grasp the same and return the marker to the position shown at the left of the machine. When the marker is thrown in the manner described from one side of the machine to the other, the loop or eye $f'$ on its drag-bar will be lifted from the pin $u'$ at one side of the runner-frame, and when the marker assumes its position at the other side of the runner-frame will take over the pin $u'$ at such other side of the machine without care or attention on the part of the driver.

The parts shown in the drawings and not referred to herein are comprised in the construction forming the subject-matter of my aforesaid contemporary application.

While I prefer, as before stated, to use my improved marker construction in the corn-planter construction of my contemporary application, I do not desire to be understood as confining myself to such use, as my improved marker construction may be embodied and used to advantage in planters of various kinds. I also do not desire to be understood as confining myself to the specific construction and arrangement of parts herein shown and described, as such changes or modifications may be made in practice as fairly fall within the scope of my claims.

Having described my invention, what I claim, and desire to secure by Letters Patent, is—

1. In a planter, the combination of a main or supporting frame, a runner-frame connected in a hinged manner thereto, a lever for raising the runner-frame, a crank arranged to be engaged by said lever, and a marker carried by the crank, whereby the marker is raised in concert with the runner-frame.

2. In a planter, the combination of a main or supporting frame, a runner-frame connected in a hinged manner thereto and having pins at its opposite sides, a lever, movable in a vertical plane, for raising the runner-frame, a crank arranged to be engaged by said lever, a marker carried by said crank, and a drag-bar connected to the marker and having an eye arranged to automatically engage the pins on the runner-frame.

3. In a planter, the combination of a main or supporting frame, a runner-frame hinged thereto and having a tongue extending rearwardly, a lever fulcrumed at an intermediate point of its length on the main or supporting frame, a connection between the forward portion of said lever and the tongue of the runner-frame, and a swinging marker having a crank arranged to be engaged by the rear portion of the lever, whereby the marker is raised in concert with the runner-frame.

4. In a planter, the combination of a main or supporting frame, a runner-frame connected in a hinged manner thereto, and having a rearwardly-extending tongue or pole, a lever fulcrumed at an intermediate point of its length on the main frame, a link connecting the forward portion of said lever and the tongue of the runner-frame, and a swinging marker having a crank arranged to be alternately engaged by parallel portions at the rear end of the lever.

5. In a planter, the combination of a main or supporting frame, a runner-frame connected in a hinged manner thereto, a lever, for raising the runner-frame, provided with parallel extensions at its rear end, and a marker having a crank arranged to be alternately engaged by the said parallel extensions of the lever.

6. In a planter, the combination of a main or supporting frame, a runner-frame hinged thereto, a lever, for raising the runner-frame, provided with parallel extensions at its rear end, antifriction-sleeves arranged on said extensions of the lever, and a swinging marker having a crank arranged to be engaged alternately by the antifriction-sleeves on the lever extensions.

7. In a planter, the combination of a main or supporting frame, a segmental rack fixed thereon, a runner-frame connected in a hinged manner to the main frame, a lever fulcrumed at an intermediate point of its length on the supporting-frame and having parallel extensions at its rear end, a connection between the forward portion of the lever and the runner-frame, a hand-lever fixed with respect to said lever and having a detent arranged to engage the segmental rack, and a marker having a crank arranged to be engaged alternately by the rearward extensions of the lever.

8. In a planter, the combination of a main or supporting frame, a runner-frame connected thereto and having upright pins at its opposite sides, a swinging marker connected to the main frame, and a draw-rod connected to the marker and having an eye adapted to automatically engage the upright pins on the runner-frame.

9. In a planter, the combination of a main or supporting frame, a runner-frame connected thereto, a swinging marker connected to the supporting-frame, a draw-rod connected to the marker, and coacting devices on said draw-rod and runner-frame, whereby the former is automatically connected to the latter.

10. In a planter, the combination of a main or supporting frame, a runner-frame connected thereto and having upright pins at its opposite sides, a swinging marker connected to the supporting-frame, a draw-rod connected to the marker and having an eye adapted to automatically engage said pins, and a brace $X^2$ interposed between the marker and draw-rod.

11. In a planter, the combination of a frame, a lever thereon, a crank journaled in the frame and arranged to be engaged by said lever, and a marker carried by the crank and movable therewith under the action of the lever.

In testimony whereof I have hereunto set my hand in presence of two subscribing witnesses.

J. W. PARKER.

Witnesses:
P. A. MERRIMAN,
P. R. INGELSON.